United States Patent
Liu et al.

(10) Patent No.: US 11,328,518 B2
(45) Date of Patent: May 10, 2022

(54) METHOD AND APPARATUS FOR OUTPUTTING INFORMATION

(71) Applicant: Apollo Intelligent Driving Technology (Beijing) Co., Ltd., Beijing (CN)

(72) Inventors: Xiang Liu, Beijing (CN); Shuang Zhang, Beijing (CN); Bin Gao, Beijing (CN); Xiaoxing Zhu, Beijing (CN); Jingjing Xue, Beijing (CN); Fan Yang, Beijing (CN); Junping Wang, Beijing (CN); Chengfa Wang, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 152 days.

(21) Appl. No.: 16/912,352

(22) Filed: Jun. 25, 2020

(65) Prior Publication Data

US 2021/0089792 A1 Mar. 25, 2021

(30) Foreign Application Priority Data

Sep. 24, 2019 (CN) .......................... 201910906113.0

(51) Int. Cl.
*G06K 9/00* (2022.01)
*G06V 20/58* (2022.01)
(Continued)

(52) U.S. Cl.
CPC ................ *G06V 20/58* (2022.01); *G06T 7/50* (2017.01); *G08G 1/16* (2013.01); *G05D 1/0231* (2013.01);
(Continued)

(58) Field of Classification Search
CPC ........ G06V 20/58; G06V 20/647; G06T 7/50; G06T 2207/10028; G06T 2207/30252;
(Continued)

(56) References Cited

U.S. PATENT DOCUMENTS 10,655,982 B2 * 5/2020 Peng .................... G01C 3/08
10,901,429 B2 * 1/2021 Wang ................ G05D 1/0274
(Continued)

FOREIGN PATENT DOCUMENTS

CA 3028703 A1 * 6/2020 ............ G01C 21/20
CN 102139696 A * 8/2011 ............ G01C 21/34
(Continued)

OTHER PUBLICATIONS

Real-Time Vehicle Detection Algorithm Based on Vision and Lidar Point Cloud Fusion, Hai Wang et al., Hindawi, Apr. 17, 2019, pp. 1-10 (Year: 2019).*
(Continued)

*Primary Examiner* — Jayesh A Patel
(74) *Attorney, Agent, or Firm* — Seed IP Law Group LLP

(57) ABSTRACT

Embodiments of the present disclosure relate to a method and apparatus for outputting information. The method may include: acquiring point cloud data and image data collected by a vehicle during a driving process; determining a plurality of time thresholds based on a preset time threshold value range; executing following processing for each time threshold: identifying obstacles included in each point cloud frame and each image frame respectively; determining a similarity between the obstacles; determining, in response to the similarity being greater than a preset similarity threshold, whether a time interval between the point cloud frame and the image frame corresponding to two similar obstacles is less than the time threshold; and processing recognized obstacles based on a determining result, to determine the number of obstacles; and determining, based on a plurality of numbers, and outputting a target time threshold.

18 Claims, 6 Drawing Sheets

(51) Int. Cl.
*G06T 7/50* (2017.01)
*G08G 1/16* (2006.01)
*G05D 1/02* (2020.01)

(52) U.S. Cl.
CPC .. *G05D 1/0276* (2013.01); *G06T 2207/10028* (2013.01); *G06T 2207/30252* (2013.01)

(58) Field of Classification Search
CPC ............ G06T 2207/30261; G08G 1/16; G05D 1/0231; G05D 1/0276; G06K 9/6293
See application file for complete search history.

(56) References Cited

U.S. PATENT DOCUMENTS

| | | | | |
|---|---|---|---|---|
| 11,004,234 | B2* | 5/2021 | Zhan | G06V 20/70 |
| 2007/0219720 | A1* | 9/2007 | Trepagnier | G05D 1/0278 |
| | | | | 701/300 |
| 2018/0108146 | A1* | 4/2018 | Zhan | G06V 20/70 |
| 2018/0157920 | A1* | 6/2018 | Hu | G06V 20/64 |
| 2018/0267166 | A1* | 9/2018 | Chen | G01S 17/931 |
| 2018/0365503 | A1* | 12/2018 | Xia | G06N 3/02 |
| 2019/0011566 | A1* | 1/2019 | Yan | G06V 20/58 |
| 2019/0079181 | A1* | 3/2019 | Mizuno | B60W 30/162 |
| 2019/0080186 | A1* | 3/2019 | Zhai | G06F 16/29 |
| 2019/0080187 | A1* | 3/2019 | Inoue | G01S 13/726 |
| 2019/0145765 | A1* | 5/2019 | Luo | G06V 10/454 |
| | | | | 702/153 |
| 2019/0171212 | A1* | 6/2019 | Wang | G05D 1/0274 |

FOREIGN PATENT DOCUMENTS

| | | | | |
|---|---|---|---|---|
| CN | 104541284 | A * | 4/2015 | ............ B60R 21/00 |
| CN | 106548630 | A * | 3/2017 | ............ G08G 1/0175 |
| CN | 109738904 | A * | 5/2019 | ............ G05D 1/0077 |
| CN | 109738904 | A | 5/2019 | |
| EP | 0697641 | A2 * | 7/1995 | |
| WO | WO-2013184464 | A1 * | 12/2013 | ............. B60R 21/00 |

OTHER PUBLICATIONS

Segmentation of Point Cloud from a 3D LIDAR using Range Difference between Neighbouring Beams, Satish K Reddy et al., ACM, 2015, pp. 1-6 (Year: 2015).*

Obstacle Detection and Terrain Classification for Autonomous Off-Road Navigation, R Mandichi et al., Springer, 2005, pp. 81-102 (Year: 2005).*

* cited by examiner

METHOD AND APPARATUS FOR OUTPUTTING INFORMATION

CROSS-REFERENCE TO RELATED APPLICATIONS

This application claims priority to Chinese Application No. 201910906113.0, filed on Sep. 24, 2019 and entitled "Method and Apparatus for Outputting Information," the entire disclosure of which is hereby incorporated by reference.

TECHNICAL FIELD

Embodiments of the present disclosure relate to the field of computer technology, and specifically to a method and apparatus for outputting information.

BACKGROUND

At present, lidar ranging has been widely used in the fields, such as autonomous driving and auxiliary driving, due to its excellent characteristics and strong adaptability to the external environment. In the application scenarios of data collected by a lidar, many parameters often need to be adjusted. Manual adjustment of these parameters is often time-consuming and labor-consuming.

SUMMARY

Embodiments of the present disclosure propose a method and apparatus for outputting information.

In a first aspect, an embodiment of the present disclosure provides a method for outputting information, including: acquiring obstacle data collected by a vehicle during a driving process, the obstacle data including point cloud data and image data; determining a plurality of time thresholds based on a preset time threshold value range; executing following processing for each time threshold: identifying obstacles included in each point cloud frame in the point cloud data and each image frame in the image data respectively; determining a similarity between an obstacle in each point cloud frame and an obstacle in each image frame; determining, in response to the similarity being greater than a preset similarity threshold, whether a time interval between the point cloud frame and the image frame corresponding to two similar obstacles is less than the time threshold; and processing recognized obstacles based on a determining result, to determine a number of obstacles; and determining, based on obtained a plurality of numbers, and outputting a target time threshold.

In some embodiments, the determining a plurality of time thresholds based on a preset time threshold value range includes: selecting a plurality of points in the time threshold value range at a preset time interval, as the plurality of time thresholds.

In some embodiments, the processing recognized obstacles based on a determining result, to determine a number of obstacles includes: associating, in response to the time interval being less than the time threshold, the two similar obstacles as the same obstacle; and non-associating, in response to the time interval being greater than or equal to the time threshold, the two similar obstacles as the same obstacle.

In some embodiments, the method further includes: fusing, in response to the associating the two similar obstacles as the same obstacle, the two similar obstacles based on the point cloud frame and the image frame corresponding to the two similar obstacles.

In some embodiments, the determining, based on obtained a plurality of numbers, and outputting a target time threshold includes: determining a number-time threshold curve based on the plurality of numbers and a time threshold corresponding to each number; and determining a slope of the curve at each time threshold, and determining the target time threshold based on each slope.

In some embodiments, the determining the target time threshold based on each slope includes: determining a maximum value of absolute values of the slopes; and using a time threshold corresponding to the maximum value as the target time threshold.

In a second aspect, an embodiment of the present disclosure provides an apparatus for outputting information, including: a data acquiring unit configured to acquire obstacle data collected by a vehicle during a driving process, the obstacle data including point cloud data and image data; a threshold determining unit configured to determine a plurality of time thresholds based on a preset time threshold value range; a data processing unit configured to execute following processing for each time threshold: identifying obstacles included in each point cloud frame in the point cloud data and each image frame in the image data respectively; determining a similarity between an obstacle in each point cloud frame and an obstacle in each image frame; determining, in response to the similarity being greater than a preset similarity threshold, whether a time interval between the point cloud frame and the image frame of two similar obstacles is less than the time threshold; and processing recognized obstacles based on a determining result, to determine a number of obstacles; and a target determining unit configured to determine, based on obtained a plurality of numbers, and output a target time threshold.

In some embodiments, the threshold determining unit is further configured to: select a plurality of points in the time threshold value range at a preset time interval, as the plurality of time thresholds.

In some embodiments, the data processing unit is further configured to: associate, in response to the time interval being less than the time threshold, the two similar obstacles as the same obstacle; and non-associate, in response to the time interval being greater than or equal to the time threshold, the two similar obstacles as the same obstacle.

In some embodiments, the apparatus further includes: a data fusing unit configured to fuse, in response to the associating the two similar obstacles as the same obstacle, the two similar obstacles based on the point cloud frame and the image frame corresponding to the two similar obstacles.

In some embodiments, the target determining unit is further configured to: determine a number-time threshold curve based on the plurality of numbers and a time threshold corresponding to each number; and determine a slope of the curve at each time threshold, and determine the target time threshold based on each slope.

In some embodiments, the target determining unit is further configured to: determine a maximum value of absolute values of the slopes; and use a time threshold corresponding to the maximum value as the target time threshold.

In a third aspect, an embodiment of the present disclosure provides an electronic device, the electronic device including: one or more processors; and a storage apparatus, storing one or more programs, where the one or more programs, when executed by the one or more processors, cause the one or more processors to implement any embodiment of the method according to the first aspect.

In a fourth aspect, an embodiment of the present disclosure provides a computer readable medium, storing a computer program thereon, where the computer program, when executed by a processor, implements any embodiment of the method according to the first aspect.

The method and apparatus for outputting information provided by some embodiments of the present disclosure may first acquire obstacle data collected by a vehicle during a driving process, the obstacle data may include point cloud data and image data; then may determine a plurality of time thresholds based on a preset time threshold value range; may execute processing for each time threshold: identifying obstacles included in each point cloud frame in the point cloud data and each image frame in the image data respectively; then determining a similarity between an obstacle in each point cloud frame and an obstacle in each image frame; determining, in response to the similarity being greater than a preset similarity threshold, whether a time interval between the point cloud frame and the image frame of two similar obstacles is less than the time threshold; and processing recognized obstacles based on a determining result, to determine the number of obstacles; and finally determine, based on obtained a plurality of numbers, and output a target time threshold. The method of the present embodiment may determine the time threshold during the obstacle data processing based on the number of obstacles, thereby achieving automatic adjustment of the time threshold without the need of manual adjustment.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
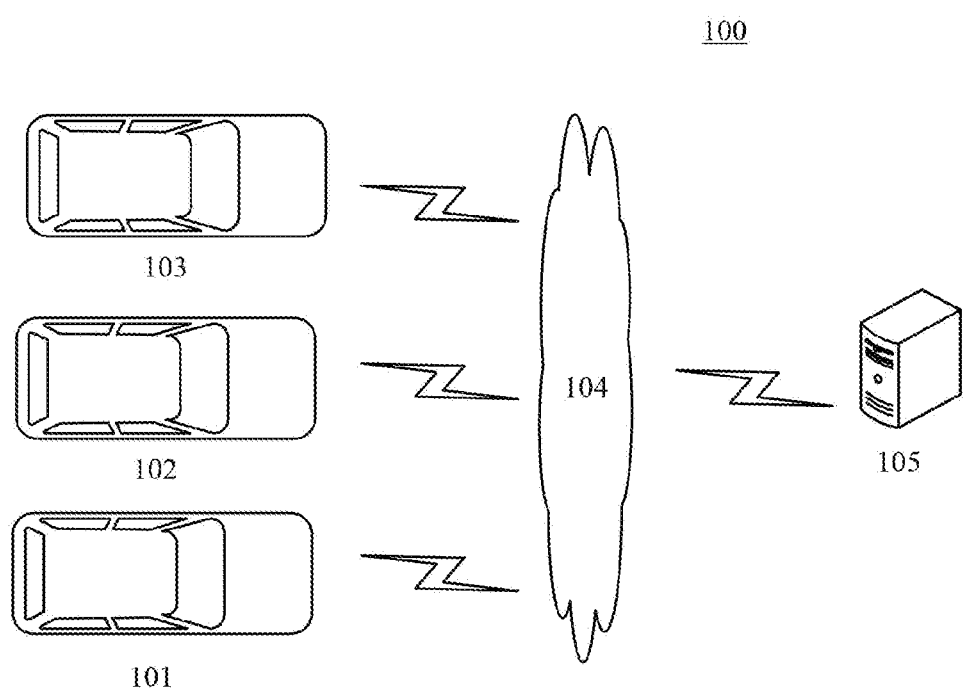
FIG. 1 is a diagram of an example system architecture in which embodiments of the present disclosure may be implemented.

FIG. 1 shows an example system architecture 100 in which a method for outputting information or an apparatus for outputting information of embodiments of the present disclosure may be implemented.

As shown in FIG. 1, the system architecture 100 may include autonomous vehicles 101, 102, and 103, a network 104, and a server 105. The network 104 serves as a medium providing a communication link between the autonomous vehicles 101, 102, and 103, and the server 105. The network 104 may include various types of connections, such as wired or wireless communication links, or optical cables.

The autonomous vehicles 101, 102, and 103 may be provided with various sensors, such as a lidar or an image collecting apparatus, to collect point cloud data or image data of a driving environment of the autonomous vehicles 101, 102, and 103. The autonomous vehicles 101, 102, and 103 may be further provided with various electronic devices, such as a navigation apparatus, an autonomous vehicle controller, an anti-lock braking system, and a braking force distribution system. The autonomous vehicles 101, 102, and 103 may be vehicles that include an autonomous driving mode, including both fully autonomous vehicles and vehicles that can be switched to the autonomous driving mode.

The server 105 may be a server that provides various services, such as a back-end server for processing obstacle data collected by the vehicles 101, 102, and 103. The back-end server can process, e.g., analyze, received data, such as the obstacle data, and return the processing result (e.g., a target time threshold) to the vehicles 101, 102, and 103.

It should be noted that the server 105 may be hardware, or may be software. When the server 105 is hardware, the server may be implemented as a distributed server cluster composed of a plurality of servers, or be implemented as a single server. When the server 105 is software, the server may be implemented as a plurality of software programs or software modules (e.g., software programs or software modules for providing distributed services), or may be implemented as a single software program or software module. This is not specifically limited here.

It should be noted that the method for outputting information provided by some embodiments of the present disclosure may be executed by the vehicles 101, 102, and 103, or may be executed by the server 105. Accordingly, the apparatus for outputting information may be provided in the vehicles 101, 102, and 103, or may be provided in the server 105.

It should be understood that the numbers of vehicles, networks, and servers in FIG. 1 are merely illustrative. Any number of vehicles, networks, and servers may be provided based on actual requirements.

Figure 2:
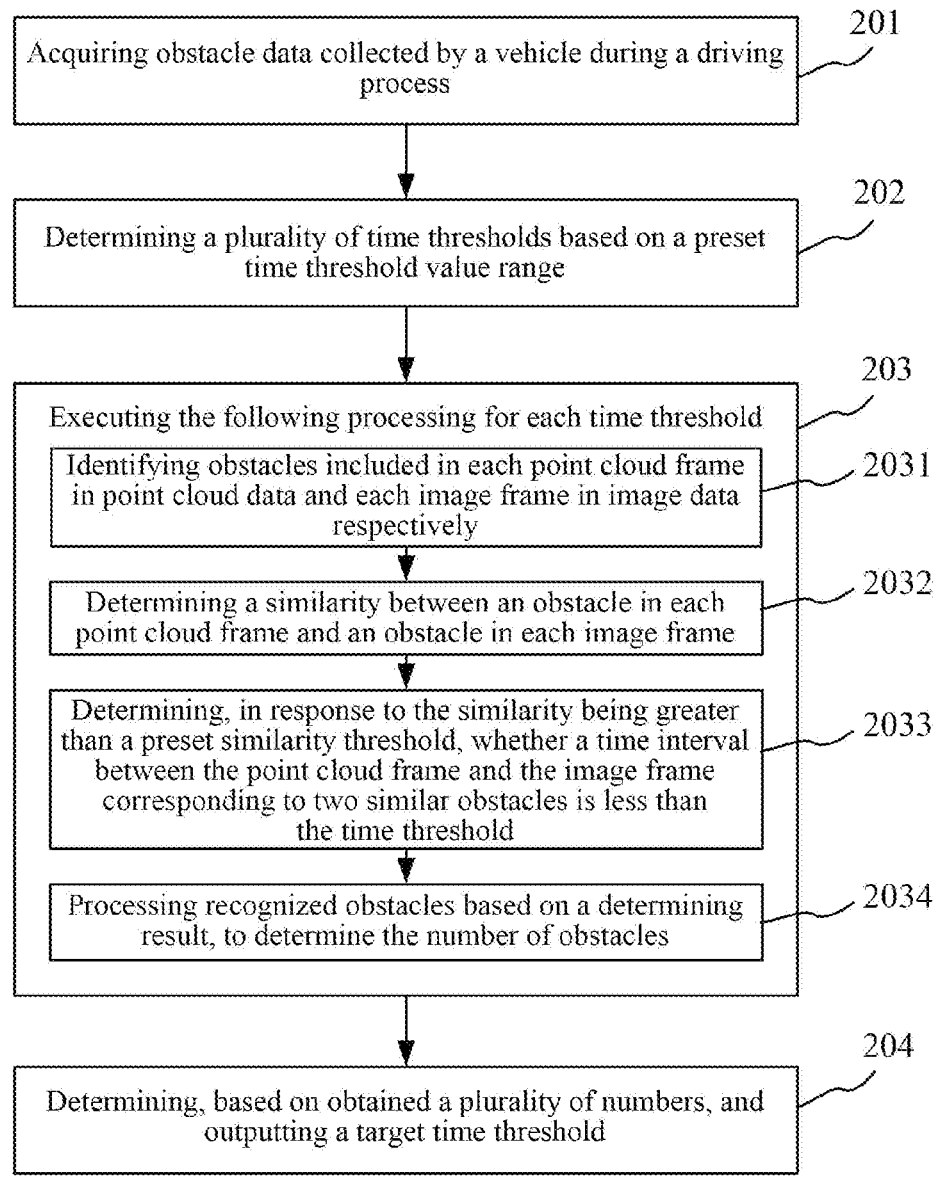
FIG. 2 is a flowchart of a method for outputting information according to an embodiment of the present disclosure.

With further reference to FIG. 2, a process 200 of a method for outputting information according to an embodiment of the present disclosure is shown. The method for outputting information includes following steps.

Step 201: acquiring obstacle data collected by a vehicle during a driving process.

In the present embodiment, an executing body (e.g., the server 105 shown in FIG. 1) of the method for outputting information may acquire the obstacle data collected by the vehicle during the driving process through a wired connection or connection. The obstacle data may include point cloud data and image data. The point cloud data may include a plurality of point cloud frames, and each point cloud frame may include a plurality of point cloud points. The image data may include a plurality of image frames. The vehicle may be provided with a lidar sensor and a camera, to collect point cloud data and image data of a surrounding environment of the vehicle during driving.

Step 202: determining a plurality of time thresholds based on a preset time threshold value range.

In the present embodiment, the executing body may acquire a preset time threshold value range, and the time threshold value range may be determined based on values of a plurality of preset time thresholds. For example, the plurality of preset time thresholds may include 0.5 ms, 1.0 ms, and 1.5 ms. Each time threshold may be set by a skilled person based on his own experience. The executing body may obtain the plurality of time thresholds by taking values at intervals of a preset duration in the time threshold value range. For example, the time threshold value range is 0.5 ms-1.5 ms. The executing body may take a value every 0.1 ms, and then may obtain the plurality of time thresholds, which are 0.5 ms, 0.6 ms, 0.7 ms, . . . , 1.5 ms, respectively. Alternatively, the executing body may also randomly select the plurality of time thresholds from the above time threshold value range.

In some alternative implementations of the present embodiment, the executing body may determine the plurality of time thresholds through the following steps that are not shown in FIG. 2: selecting a plurality of points in the time threshold value range at a preset time interval, as the plurality of time thresholds.

In the present implementation, the executing body may select the plurality of points in the time threshold value range at the preset time interval, as the plurality of time thresholds. Specifically, the time threshold value range may be divisible by the time interval.

Step 203: executing the following processing steps 2031-2034 for each time threshold.

After obtaining the plurality of time thresholds, the executing body may perform the processing steps 2031-2034 for each time threshold.

Step 2031: identifying obstacles included in each point cloud frame in point cloud data and each image frame in image data respectively.

The executing body may identify the obstacles included in each point cloud frame in the point cloud data, and may also identify the obstacles included in each image frame in the image data, using a pre-trained obstacle recognition model or an obstacle recognition algorithm (e.g., a point cloud segmentation algorithm, or a feature extraction algorithm). Specifically, the executing body may input each point cloud frame in the point cloud data or each image frame in the image data into the obstacle recognition model from an input side, such that recognized obstacles may be obtained from an output side of the obstacle recognition model.

Step 2032: determining a similarity between an obstacle in each point cloud frame and an obstacle in each image frame.

After recognizing the obstacles included in each point cloud frame and each image frame, the executing body may compute the similarity between the obstacle in each point cloud frame and the obstacle in each image frame. Specifically, the executing body may extract features of the obstacles and compute the similarity between the obstacles based on a distance between feature vectors.

Step 2033: determining, in response to the similarity being greater than a preset similarity threshold, whether a time interval between the point cloud frame and the image frame corresponding to two similar obstacles is less than the time threshold.

For each obtained similarity, the executing body may determine whether the similarity is greater than the preset similarity threshold. Here, the similarity threshold may be used for characterizing a degree of similarity between obstacles. If the similarity is greater than the similarity threshold, then the two obstacles are very similar. Then, the executing body may further determine the point cloud frame and the image frame of the two similar obstacles. Then, the time interval between the point cloud frame and the image frame is computed, and whether the above time interval is greater than the time threshold is determined.

Step 2034: processing recognized obstacles based on a determining result, to determine the number of obstacles.

After obtaining the determining result, the executing body may process the recognized obstacles based on the determining result, to determine the number of obstacles. Specifically, in response to the time interval being less than the time threshold, the executing body may identify the two obstacles as the same obstacle. In response to the time interval being greater than or equal to the time threshold, the executing body may not identify the two obstacles as the same obstacle. It can be understood that if the two obstacles are identified as the same obstacle, then the two obstacles are statisticized as one obstacle, when statisticizing the number of obstacles. If the two obstacles are not identified as the same obstacle, then the two obstacles are statisticized as two obstacles, when statisticizing the number of obstacles. Thus, the number of recognized obstacles can be determined at each time threshold.

In some alternative implementations of an embodiment, the executing body may determine the number of obstacles in the following ways that are not shown in FIG. 2: associating, in response to the time interval being less than the time threshold, the two similar obstacles as the same obstacle; and non-associating, in response to the time interval being greater than or equal to the time threshold, the two similar obstacles as the same obstacle.

In some alternative implementations of an embodiment, the above method may further include the following steps that are not shown in FIG. 2: fusing, in response to the associating the two similar obstacles as the same obstacle, the two similar obstacles based on the point cloud frame and the image frame corresponding to the two similar obstacles.

In response to the associating the two similar obstacles as the same obstacle, the executing body may fuse the two similar obstacles based on the point cloud frame and the image frame corresponding to the two similar obstacles. Thus, more accurate obstacle information can be obtained for guiding the driving of the autonomous vehicle.

Step 204: determining, based on obtained a plurality of numbers, and outputting a target time threshold.

In the present embodiment, with the increase of the time threshold, the more are the similar obstacles likely to be associated, and the smaller is the number of obtained obstacles. Accordingly, the smaller is the time threshold, the less are the similar obstacles likely to be associated, and the larger is the number of obtained obstacles. Then, the executing body may determine a change rate of the numbers of obstacles based on the obtained numbers, and determine the target time threshold based on the change rate.

Figure 3:
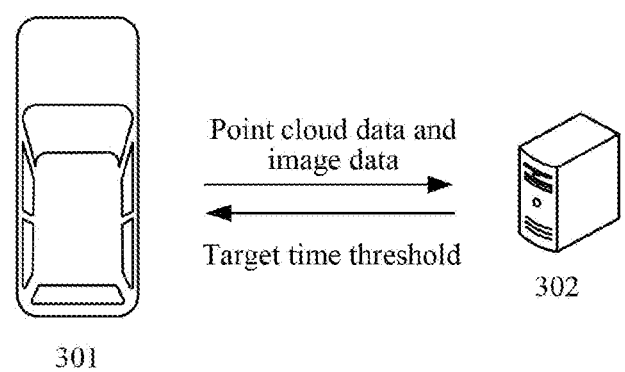
FIG. 3 is a schematic diagram of an application scenario of a method for outputting information according to an embodiment of the present disclosure.

With further reference to FIG. 3, FIG. 3 is a schematic diagram of an application scenario of the method for outputting information according to the present embodiment. In the application scenario of FIG. 3, an autonomous vehicle 301 collects point cloud data through a lidar sensor provided thereon, collects image data through a camera provided thereon during a driving process, and sends the point cloud data and the image data to a server 302. The server 302 performs processing in steps 201-204 for the point cloud data and the image data, to determine a target time threshold, and sends the target time threshold to the autonomous vehicle 301. The autonomous vehicle 301 may fuse obstacles during the driving process based on the target time threshold.

The method for outputting information provided by embodiments of the present disclosure may first acquire obstacle data collected by a vehicle during a driving process, where the obstacle data may include point cloud data and image data; then may determine a plurality of time thresholds based on a preset time threshold value range; may execute processing for each time threshold: identifying obstacles included in each point cloud frame in the point cloud data and each image frame in the image data respectively; then determining a similarity between an obstacle in each point cloud frame and an obstacle in each image frame; determining, in response to the similarity being greater than a preset similarity threshold, whether a time interval between the point cloud frame and the image frame of two similar obstacles is less than the time threshold; and processing recognized obstacles based on a determining result, to determine the number of obstacles; and finally determines, based on obtained a plurality of numbers, and outputs a target time threshold. The method of the present embodiment may determine the time threshold during the obstacle data processing based on the numbers of obstacles, thereby achieving automatic adjustment of the time threshold without the need of manual adjustment.

Figure 4:
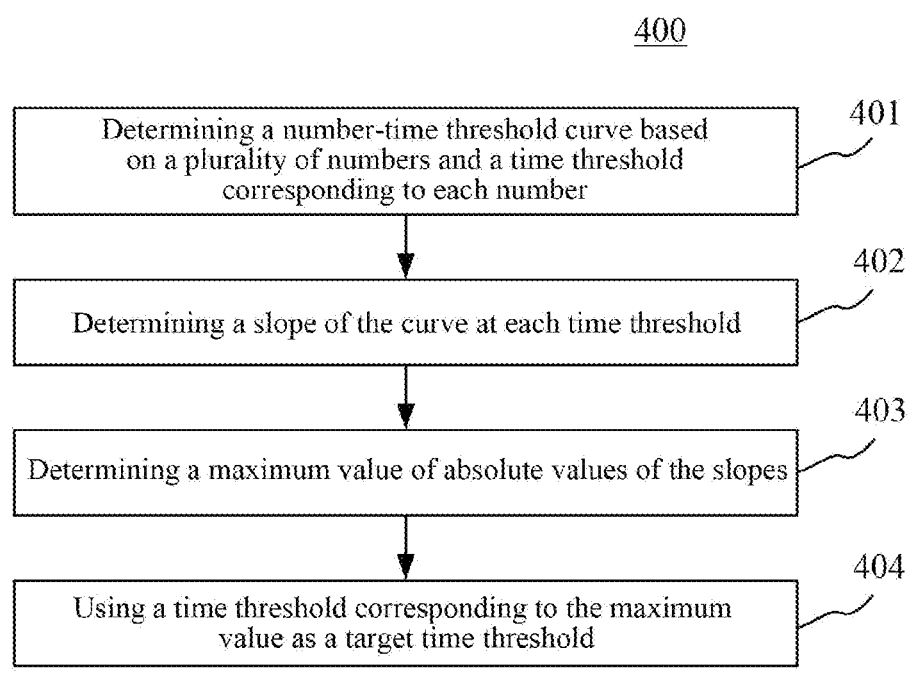
FIG. 4 is a flowchart of determining a target time threshold in the method for outputting information according to an embodiment of the present disclosure.

With further reference to FIG. 4, a process 400 of determining a target time threshold in the method for outputting information according to an embodiment of the present disclosure is shown. As shown in FIG. 4, the method for outputting information according to the present embodiment may determine a target time threshold through the following steps.

Step 401: determining a number-time threshold curve based on a plurality of numbers and a time threshold corresponding to each number.

In the present embodiment, the executing body may obtain a number-time threshold curve with the time threshold as the X axis, with the number of obstacles as the Y axis, based on the obtained plurality of numbers and the time threshold corresponding to each number.

Step 402: determining a slope of the curve at each time threshold.

Then, the executing body may determine the slope of the curve at each time threshold based on an equation of the curve. The slope here can represent a change rate of the numbers of obstacles. The executing body may determine the target time threshold based on the obtained each slope. For example, the executing body may use a time threshold with a maximum absolute value of the slope as the target time threshold. Alternatively, the executing body may compute an average value of the slopes, and then use a time threshold corresponding to the average value as the target time threshold. It can be understood that the target time threshold is determined based on the curve, and may be the same as, or different from, the preset time threshold.

Step 403: determining a maximum value of absolute values of the slopes.

In the present embodiment, the executing body may determine the maximum value of the absolute values of the slopes. It can be understood that the less is the time threshold, i.e., the larger is the number of obstacles, the more is the false detection likely to take place, and the higher is the false detection rate. The greater is the time threshold, i.e., the smaller is the number of obstacles, the more is the missed detection likely to take place, and the higher is the missed detection rate. Here, a point corresponding to the maximum value is a point at which the number of obstacles decreases fastest, and is also an intersection point of a false detection rate curve and a missed detection rate curve.

Step 404: using a time threshold corresponding to the maximum value as a target time threshold.

The executing body may use the time threshold corresponding to the maximum value as the target time threshold.

The method for outputting information provided by embodiments of the present disclosure may automatically determine an appropriate time threshold, thereby reducing the workload in the process of obstacle data processing.

Figure 5:
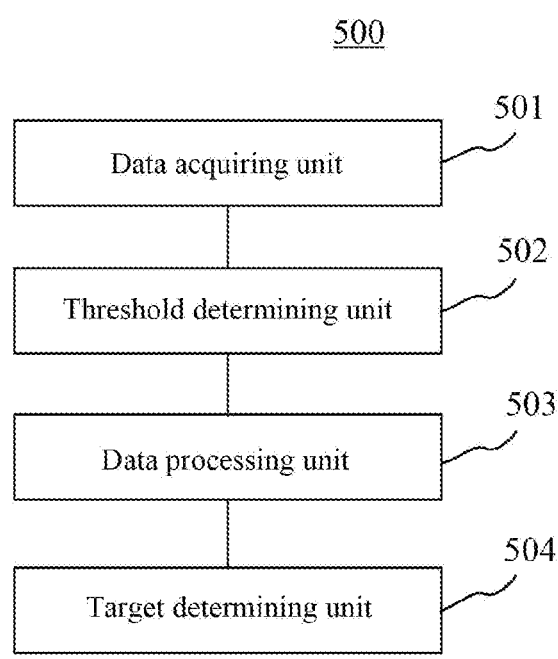
FIG. 5 is a schematic structural diagram of an apparatus for outputting information according to an embodiment of the present disclosure.

With further reference to FIG. 5, as an implementation of the method shown in the above figures, an embodiment of the present disclosure provides an apparatus for outputting information. An embodiment of the apparatus may correspond to an embodiment of the method shown in FIG. 2. The apparatus may be specifically applied to various electronic devices.

As shown in FIG. 5, the apparatus 500 for outputting information of the present embodiment includes: a data acquiring unit 501, a threshold determining unit 502, a data processing unit 503, and a target determining unit 504.

The data acquiring unit 501 is configured to acquire obstacle data collected by a vehicle during a driving process. The obstacle data include point cloud data and image data.

The threshold determining unit 502 is configured to determine a plurality of time thresholds based on a preset time threshold value range.

The data processing unit 503 is configured to execute the following processing for each time threshold: identifying obstacles included in each point cloud frame in the point cloud data and each image frame in the image data respectively; determining a similarity between an obstacle in each point cloud frame and an obstacle in each image frame; determining, in response to the similarity being greater than a preset similarity threshold, whether a time interval between the point cloud frame and the image frame corresponding to two similar obstacles is less than the time threshold; and processing recognized obstacles based on a determining result, to determine the number of obstacles.

The target determining unit is configured to determine, based on obtained a plurality of numbers, and output a target time threshold.

In some alternative implementations of the present embodiment, the threshold determining unit 502 may be further configured to: select a plurality of points in the time threshold value range at a preset time interval, as the plurality of time thresholds.

In some alternative implementations of the present embodiment, the data processing unit 503 may be further configured to: associate, in response to the time interval being less than the time threshold, the two similar obstacles as the same obstacle; and non-associate, in response to the time interval being greater than or equal to the time threshold, the two similar obstacles as the same obstacle.

In some alternative implementations of the present embodiment, the above apparatus 500 may further include a data fusing unit that is not shown in FIG. 5, and is configured to fuse, in response to the associating the two similar obstacles as the same obstacle, the two similar obstacles based on the point cloud frame and the image frame corresponding to the two similar obstacles.

In some alternative implementations of the present embodiment, the target determining unit 504 may be further configured to: determine a number-time threshold curve based on the plurality of numbers and a time threshold corresponding to each number; and determine a slope of the curve at each time threshold, and determine the target time threshold based on each slope.

In some alternative implementations of the present embodiment, the target determining unit 504 may be further configured to: determine a maximum value of absolute values of the slopes; and use a time threshold corresponding to the maximum value as the target time threshold.

It should be understood that the unit 501 to unit 504 recorded in the apparatus 500 for outputting information correspond to the steps in the method described in FIG. 2 respectively. Therefore, the operations and features described above for the method for outputting information also apply to the apparatus 500 and the units included therein. The description will not be repeated here.

Figure 6:
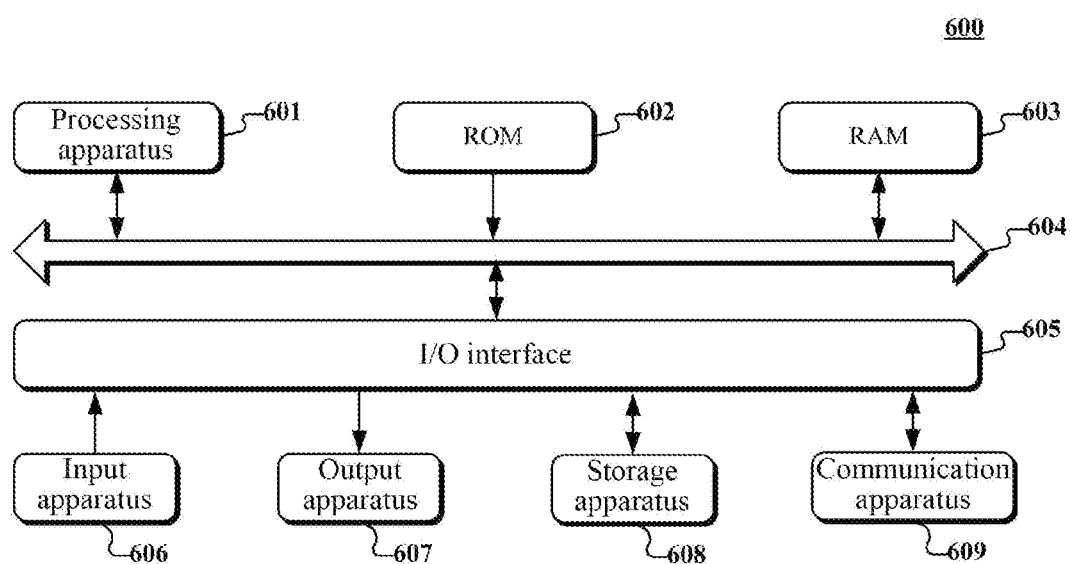
FIG. 6 is a schematic structural diagram of a computer system adapted to implement an electronic device of embodiments of the present disclosure.

Referring to FIG. 6 below, a schematic structural diagram adapted to implement an electronic device 600 of some embodiments of the present disclosure is shown. The electronic device shown in FIG. 6 is merely an example, and should not limit the functions and scope of use of some embodiments of the present disclosure.

As shown in FIG. 6, the electronic device 600 may include a processing apparatus (e.g., a central processing unit, or a graphics processor) 601, which may execute various appropriate actions and processes in accordance with a program stored in a read-only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

In general, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal display device (LCD), a speaker, a vibrator, or the like; a storage apparatus 608 including a magnetic tape, a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to some embodiments of the present disclosure, the process described above with reference to the flow chart may be implemented in a computer software program. For example, some embodiments of the present disclosure include a computer program product, which includes a computer program that is tangibly embedded in a computer readable medium. The computer program includes program codes for executing the method as shown in the flow chart. In such an embodiment, the computer program may be downloaded and installed from a network via the communication apparatus 609, or be installed from the storage apparatus 608, or be installed from the ROM 602. The computer program, when executed by the processing apparatus 601, implements the above functions as defined by the method of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: acquire obstacle data collected by a vehicle during a driving process, the obstacle data including point cloud data and image data; determine a plurality of time thresholds based on a preset time threshold value range; execute following processing for each time threshold: identifying obstacles included in each point cloud frame in the point cloud data and each image frame in the image data respectively; determining a similarity between an obstacle in each point cloud frame and an obstacle in each image frame; determining, in response to the similarity being greater than a preset similarity threshold, whether a time interval between the point cloud frame and the image frame of two similar obstacles is less than the time threshold; and processing recognized obstacles based on a determining result, to determine the number of obstacles; and determine, based on obtained a plurality of numbers, and output a target time threshold.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including a data acquiring unit, a threshold determining unit, a data processing unit, and a target determining unit. The names of the units do not constitute a limitation to such units themselves in some cases. For example, the data acquiring unit may be further described as "a unit configured to acquire obstacle data collected by a vehicle during a driving process."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for outputting information, comprising:
   acquiring obstacle data collected by a vehicle during a driving process, the obstacle data including point cloud data and image data;
   determining a plurality of time thresholds based on a preset time threshold value range;
   executing following processing for each time threshold: identifying obstacles included in each point cloud frame in the point cloud data and each image frame in the image data respectively; determining a similarity between an obstacle in each point cloud frame and an obstacle in each image frame; determining, in response to the similarity being greater than a preset similarity threshold, whether a time interval between the point cloud frame and the image frame corresponding to two similar obstacles is less than the time threshold; and processing recognized obstacles based on a determining result, to determine a number of obstacles; and
   determining, based on obtained a plurality of numbers, and outputting a target time threshold.

2. The method according to claim 1, wherein the determining a plurality of time thresholds based on a preset time threshold value range comprises:
   selecting a plurality of points in the time threshold value range at a preset time interval, as the plurality of time thresholds.

3. The method according to claim 1, wherein the processing recognized obstacles based on a determining result, to determine a number of obstacles comprises:
   associating, in response to the time interval being less than the time threshold, the two similar obstacles as the same obstacle; and
   non-associating, in response to the time interval being greater than or equal to the time threshold, the two similar obstacles as the same obstacle.

4. The method according to claim 3, wherein the method further comprises:
   fusing, in response to the associating the two similar obstacles as the same obstacle, the two similar obstacles based on the point cloud frame and the image frame corresponding to the two similar obstacles.

5. The method according to claim 1, wherein the determining, based on obtained a plurality of numbers, and outputting a target time threshold comprises:
   determining a number-time threshold curve based on the plurality of numbers and a time threshold corresponding to each number; and
   determining a slope of the curve at each time threshold, and determining the target time threshold based on each slope.

6. The method according to claim 5, wherein the determining the target time threshold based on each slope comprises:
   determining a maximum value of absolute values of the slopes; and
   using a time threshold corresponding to the maximum value as the target time threshold.

7. An apparatus for outputting information, comprising:
   at least one processor; and
   a memory storing instructions, the instructions when executed by the at least one processor, causing the at least one processor to perform operations, the operations comprising:
   acquiring obstacle data collected by a vehicle during a driving process, the obstacle data including point cloud data and image data;

determining a plurality of time thresholds based on a preset time threshold value range;

executing following processing for each time threshold: identifying obstacles included in each point cloud frame in the point cloud data and each image frame in the image data respectively; determining a similarity between an obstacle in each point cloud frame and an obstacle in each image frame; determining, in response to the similarity being greater than a preset similarity threshold, whether a time interval between the point cloud frame and the image frame of two similar obstacles is less than the time threshold; and processing recognized obstacles based on a determining result, to determine a number of obstacles; and determining, based on obtained a plurality of numbers, and output a target time threshold.

8. The apparatus according to claim 7, wherein the determining a plurality of time thresholds based on a preset time threshold value range comprises:

selecting a plurality of points in the time threshold value range at a preset time interval, as the plurality of time thresholds.

9. The apparatus according to claim 7, wherein the processing recognized obstacles based on a determining result, to determine a number of obstacles comprises:

associating, in response to the time interval being less than the time threshold, the two similar obstacles as the same obstacle; and non-associating, in response to the time interval being greater than or equal to the time threshold, the two similar obstacles as the same obstacle.

10. The apparatus according to claim 9, wherein the operations further comprise:

fusing, in response to the associating the two similar obstacles as the same obstacle, the two similar obstacles based on the point cloud frame and the image frame corresponding to the two similar obstacles.

11. The apparatus according to claim 7, wherein the determining, based on obtained a plurality of numbers, and outputting a target time threshold comprises:

determining a number-time threshold curve based on the plurality of numbers and a time threshold corresponding to each number; and determining a slope of the curve at each time threshold, and determining the target time threshold based on each slope.

12. The apparatus according to claim 11, wherein the determining the target time threshold based on each slope comprises:

determining a maximum value of absolute values of the slopes; and using a time threshold corresponding to the maximum value as the target time threshold.

13. A non-transitory computer readable medium, storing a computer program thereon, wherein the computer program, when executed by a processor, causes the processor to perform operations, the operations comprising:

acquiring obstacle data collected by a vehicle during a driving process, the obstacle data including point cloud data and image data;

determining a plurality of time thresholds based on a preset time threshold value range;

executing following processing for each time threshold: identifying obstacles included in each point cloud frame in the point cloud data and each image frame in the image data respectively; determining a similarity between an obstacle in each point cloud frame and an obstacle in each image frame; determining, in response to the similarity being greater than a preset similarity threshold, whether a time interval between the point cloud frame and the image frame corresponding to two similar obstacles is less than the time threshold; and processing recognized obstacles based on a determining result, to determine a number of obstacles; and determining, based on obtained a plurality of numbers, and outputting a target time threshold.

14. The non-transitory computer readable medium according to claim 13, wherein the determining a plurality of time thresholds based on a preset time threshold value range comprises:

selecting a plurality of points in the time threshold value range at a preset time interval, as the plurality of time thresholds.

15. The non-transitory computer readable medium according to claim 13, wherein the processing recognized obstacles based on a determining result, to determine a number of obstacles comprises:

associating, in response to the time interval being less than the time threshold, the two similar obstacles as the same obstacle; and non-associating, in response to the time interval being greater than or equal to the time threshold, the two similar obstacles as the same obstacle.

16. The non-transitory computer readable medium according to claim 15, wherein the operations further comprise:

fusing, in response to the associating the two similar obstacles as the same obstacle, the two similar obstacles based on the point cloud frame and the image frame corresponding to the two similar obstacles.

17. The non-transitory computer readable medium according to claim 13, wherein the determining, based on obtained a plurality of numbers, and outputting a target time threshold comprises:

determining a number-time threshold curve based on the plurality of numbers and a time threshold corresponding to each number; and determining a slope of the curve at each time threshold, and determining the target time threshold based on each slope.

18. The non-transitory computer readable medium according to claim 17, wherein the determining the target time threshold based on each slope comprises:

determining a maximum value of absolute values of the slopes; and using a time threshold corresponding to the maximum value as the target time threshold.

* * * * *